May 26, 1964  I. C. QUACKENBUSH ETAL  3,134,549
DISPERSING APPARATUS
Filed Aug. 1, 1961  2 Sheets-Sheet 1
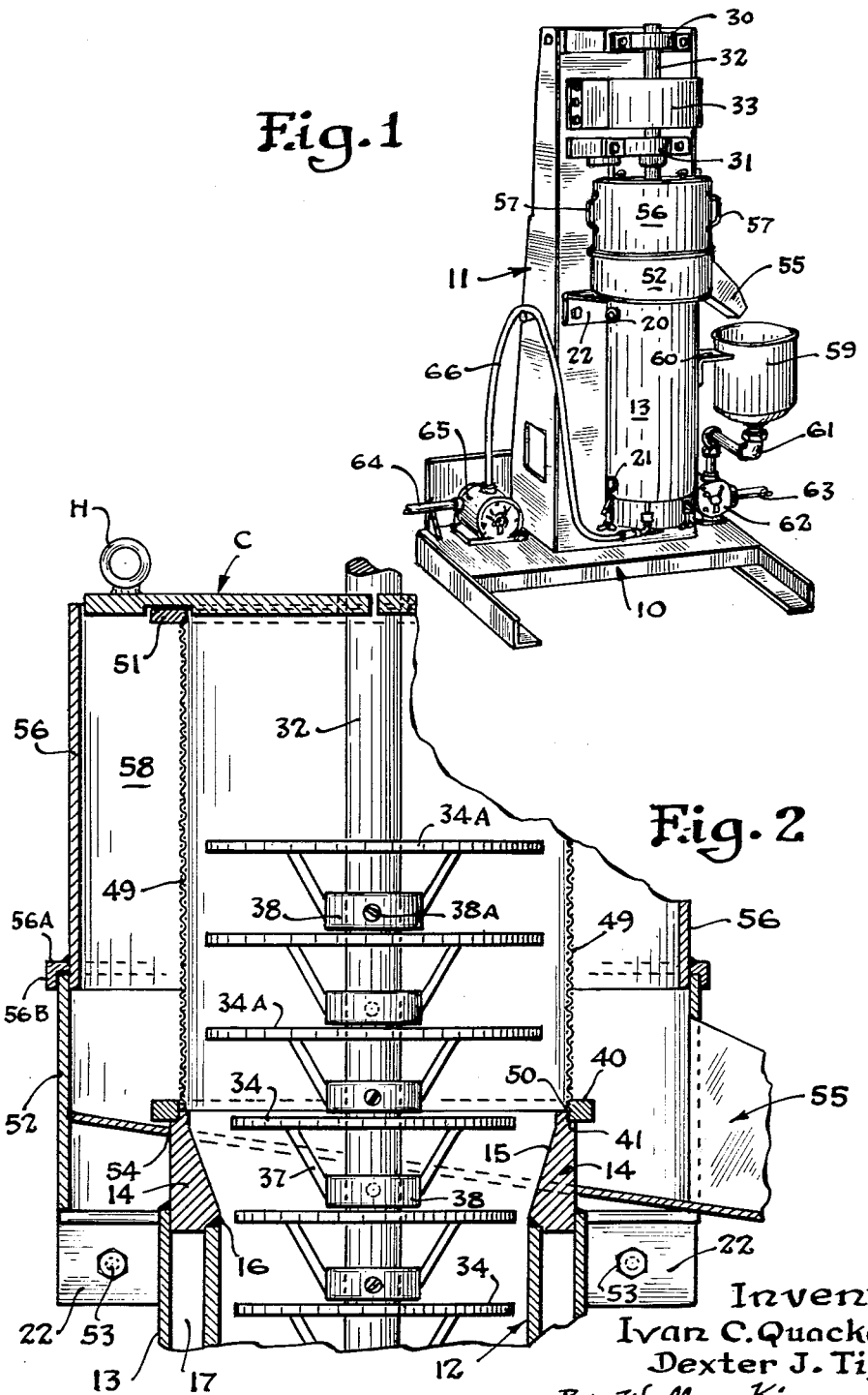
Inventors
Ivan C. Quackenbush
Dexter J. Tight
By Wallace, Kinzer and Dorn
Attorneys May 26, 1964  I. C. QUACKENBUSH ETAL  3,134,549
DISPERSING APPARATUS
Filed Aug. 1, 1961  2 Sheets—Sheet 2
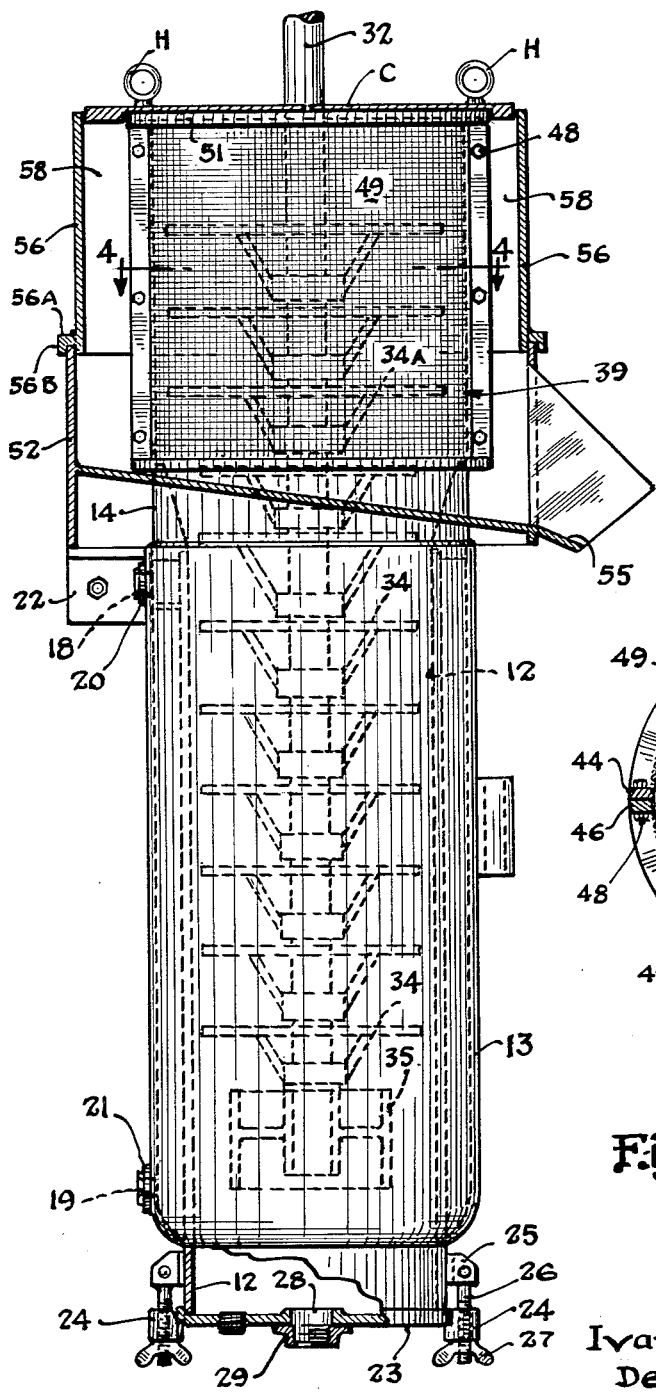
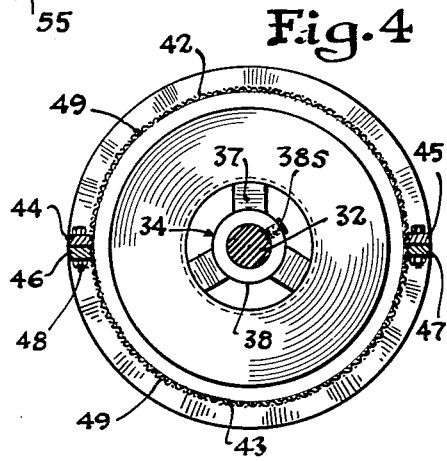
Inventors
Ivan C. Quackenbush
Dexter J. Tight
By Wallace, Kinzer and Dorn
Attorneys

United States Patent Office 3,134,549
Patented May 26, 1964

3,134,549
DISPERSING APPARATUS
Ivan C. Quackenbush, Arlington Heights, Ill., and Dexter J. Tight, Woodside, Calif., assignors to Chicago Boiler Company, Chicago, Ill., a corporation of Illinois
Filed Aug. 1, 1961, Ser. No. 128,518
9 Claims. (Cl. 241—74)

This invention relates to deagglomerating and dispersing particulate solids in liquids and is especially useful in dispersing pigment and the like in film forming material to afford finishes such as house and architectural paints and other finishes, including automotive and industrial and like finishes, and the invention is likewise useful in ink and dyestuff manufacture and other instances where milling is to be effected in the course of production of the final product.

In this regard, what is known as the sand grinding process is now commonly used in the production of automotive, industrial and kindred finishes where a high grind has been found to be desirable. However, such process has had but relatively limited usage in the production of finishes such as house paints, for both exterior and interior walls, and the like where high volume of low grind products is an attribute to economical and expeditious production.

The sand grinding process and apparatus disclosed in United States Letters Patent No. 2,581,414 entails agitating film forming material and pigment to be dispersed therein in sand, such agitation being effected in suitable apparatus sufficiently to insure quite uniform dispersion of particulate solids in film forming material whereupon separation of the resultant dispersion from the sand is effected. An apparatus in which such sand grinding may be expeditiously and efficiently effected is disclosed in United States Letters Patent No. 2,855,156. As disclosed in this patent, resort is had to a vertical hollow cylindrical vessel into which the sand is introduced and a slurry of pigment and film forming material is forced thereinto at or near the bottom of such a cylindrical vessel. The slurry and sand are subjected to agitation by a rotating shaft extending downwardly into the vessel generally along the vertical axis thereof and suitable impellers mounted on said shaft in spaced apart relation. A cylindrical screen is mounted at the top of such vessel in alignment with the inner wall thereof, and the aforesaid shaft is extended axially through such screen and enclosed area and has impellers mounted thereon in such area. The operation of the apparatus normally is effective to produce a uniform dispersion of the slurry ingredients and is also effective to force such dispersion through the screen, the interstices of which are of sufficient size to permit the dispersion to freely flow therethrough, while at the same time separating sand therefrom and retaining the same in the apparatus. Such sand grinding as disclosed in the aforesaid patents tends to grind a slurry introduced thereinto to its ultimate fineness, and is therefore quite suitable in the production of finishes wherein a high grind is desirable. It has been found, however, for example, in those instances where a low grind finish is to be produced, that a full sand charge, especially in the apparatus disclosed in Patent No. 2,855,156, may prevent the slurry from passing through the apparatus and the screen at a rate fast enough to prevent overgrinding. Resultantly, particularly where low grind finishes are to be produced by resort to sand grinding, it has been customary to substantially reduce the sand charge in the apparatus which, of course, entails interrupting operation of the apparatus and some disassembling thereof in order that sand may be removed therefrom. So to do entails interruption of operation of the apparatus with the resultant loss of production therefrom, and even in such circumstances it has been difficult to process finishes of high viscosity and of paste-like character.

Yet further, in sand grinding to produce finishes as this has heretofore been practiced, the volume of the slurry to be processed has been related to the sand charge, for it has been found that in instances where a normal sand charge is maintained in the apparatus and the rate of grinding of the slurry by the sand particles has been increased in an endeavor to lower the grind and thereby realize comparatively high volume production of a low grind finish such, for example, as an enamelized house paint, the sand has been forced far up into the screen enclosed area of the apparatus with the result that proper operation especially of the impellers in such area has been impaired. It has been observed that in some instances sand has been forced or floated to and over the top of the enclosing screen so as to thereby be commingled with the product properly flowing through the interstices of the screen and this results in the production of an unacceptable sand bearing product which is therefore rejected and usually scrapped. Moreover, sand forced or floated to and over the top of the screen and commingled as aforesaid has necessitated interruption of the operation, and some disassembly of the apparatus in order to rid the same of the unacceptable sand bearing product and to otherwise enable the apparatus to be cleaned before further and satisfactory operation of the apparatus could be effected.

The slurry which is processed by sand grinding is usually akin to that subjected to roll, pebble or like grinding milling or other well-known grinding operations. There have been instances, however, where a slurry normally processed in a roller mill has been unsuitable for sand grinding, particularly because of the high viscosity and paste-like character of such a slurry.

It is therefore a primary object of the present invention to effect sand grinding over a wide range of degree of finished dispersion, whether of high or low grind and over a wide range of apparent viscosities, without altering the sand charge in the apparatus in which the sand grinding operation is effected.

Another object is to so increase the screened area of apparatus in which sand grinding is to be effected that a relatively high volume of particularly a low grind or high viscosity finish may be processed and yet produce a commercially satisfactory finish.

Still another object of the invention is to increase the peripheral speed of the impellers located in the screened area of the apparatus and yet insure that a commercially satisfactory finish will be discharged through the screen while the sand is retained in the apparatus, and a related object is to maintain a predetermined charge of sand in the apparatus so as to thereby enable the apparatus to be kept in an advantageous continuous operation whereby to realize the production of particularly low grind or high viscosity finishes in a rapid, economical and efficient manner.

It is usually objectionable in conventional sand grinding apparatus to have very much of the sand included therein forced into the screened area thereof since so to do may impair the quality of the finish. Hence, a yet further object of this invention is to so relate the capacity of the vertical cylindrical vessel in which sand grinding is effected and the operation of the impellers therein to the screened area of the apparatus and the operation of the impellers included therein that the production of particularly low grind and high viscosity finishes may be effected notwithstanding some of the sand being forced from the cylnidrical vessel, where it is normally contained, into the screened area of the apparatus.

More specifically, an object of this invention is to afford a relatively enlarged discharge screen area in an apparatus of the aforesaid character and especially one of a diameter larger than that of the cylindrical mixing vessel that is a part of the apparatus and to increase the size of the impellers in the screened area of the apparatus and yet insure that the functioning of the apparatus will not be so impaired as to preclude the production of commercially satisfactory finishes or high or low grind.

Another object is to insure free and unimpeded transition of the contents of the apparatus from the top of the cylindrical mixing vessel to the screened area thereof, and more specifically, it is a further object to resort to an appropriately inclined surface over which unimpeded flow may be effected from the top of the cylindrical vessel to the screened area of the apparatus.

Other and further objects of the present invention will be apparent from the following description and claims and are illustrated in the accompanying drawings which, by way of illustration, show a preferred embodiment of the present invention and the principles thereof and what are now considered to be the best mode for applying these principles. Other embodiments of the invention embodying the same or equivalent principles may be made as desired by those skilled in the art without departing from the present invention and the purview of the appended claims.

In the drawings:

FIG. 1 is a perspective view of an apparatus embodying the present invention;

FIG. 2 is a vertical sectional view, drawn to an enlarged scale, of the upper portion of the mixing vessel and the screen enclosed area of the apparatus;

FIG. 3 is an elevational view wherein a portion of the lower wall of the mixing vessel is broken away and wherein the housing at the upper part of the apparatus and discharge chute are shown in section;

FIG. 4 is a horizontal view taken substantially on the line 4—4 on FIG. 3; and

FIG. 5 is a vertical sectional view of a typical impeller employed in the apparatus.

The embodiment of the invention illustrated in the accompanying drawings includes a base 10 on which an upright frame 11 is mounted. The vertical cylindrical mixing vessel 12 is disposed forwardly of the front face of the frame 11 and is formed from suitable tubing or the like. The inside diameter and length of the vessel 12 are determined by the desired capacity of the apparatus. The upright vessel 12 is surrounded by a tubular member or jacket 13 which is of a greater diameter than the outside diameter of the vessel 12. The lower end of the member 13 is directed inwardly and is welded or otherwise suitably joined to the outer wall of the member 12 in spaced relation with the lower end thereof as shown in FIG. 3.

A ring 14 is positioned at the upper ends of the members 12 and 13 in such a way that the upper marginal portion of the jacket 13 engages and surrounds the lower part of the outer periphery of the ring 14, and the jacket 13 is joined to the ring 14 by welding or in any other suitable manner. The inner face 15 of the ring 14 is downwardly and inwardly inclined and the lower edge thereof terminates in a groove 16 into which the upper marginal portion of the vessel 12 is extended, and this vessel is united with the ring by being welded thereto or in any other suitable manner. The arrangement is such that a closed chamber 17 is afforded between the vessel 12 and the jacket 13. As best shown in FIG. 3, openings as 18 and 19 extend through the jacket 13, and desirably coupling members 20 and 21 are respectively associated with the openings 18 and 19, the arrangement preferably being such that tapped openings will be afforded into which threaded ends of pipes (not shown) may be secured. This arrangement enables the chamber 17 to be filled with either a heating or cooling fluid, dependent upon the requirements of the operation being effected in the apparatus, as will be described more fully presently. Such fluid is directed into the chamber 17 either through the pipe connected to the coupling 20 or that connected to the coupling 21 and is withdrawn from such chamber through the pipe connected to the other of the couplings whereby circulation of the fluid in the chamber 17 may be effected.

Brackets as 22, FIG. 1, are secured to the forwardly disposed face of the upright frame 11, and these brackets are also connected to the jacket 13 whereby this jacket and the mixing vessel 12 are supported by the frame 11 forwardly thereof.

Desirably, and as best shown in FIG. 1, the lower end of the vessel 12 terminates in spaced relation with the upper surface of the base 10. This lower end of the vessel 12 is closed by a bottom plate 23 which includes an upstanding peripheral flange, the inner face of which is engaged with the outer periphery of the vessel 12 when the lower end of such vessel is engaged with the upper face of the bottom plate 23. As best shown in FIG. 3, notches at the upper ends of collars as 24 engage a downwardly facing lip on the periphery of the plate 23. Brackets as 25 are welded or otherwise suitably secured to the periphery of the vessel 12 between the lower end thereof and the connection of the jacket 13 to such vessel. Bolts as 26 are pivotally mounted in the brackets 25 and extended through the collars 24 and the outer ends of such bolts extend beyond the outer ends of the collars. Wing nuts as 27 are fitted onto the threaded free ends of the bolts as 26 and when tightened serve to clamp the bottom plate 23 tightly against the lower end of the vessel 12 so as to insure against leakage from the vessel, the notches on the collars as 24 engaging the lip on the plate 23 to effectuate such clamping.

In the present instance an opening 28 is provided at the center of the plate 23, and a coupler as 29 is secured to the exposed face of the plate 23 as by being welded thereto, and the tapped opening in the coupling 29 is aligned with the opening 28. As will be explained presently, the slurry to be processed in the apparatus is introduced thereinto through a suitable pipe fitted into the tapped opening in the coupling 29.

Bearing members as 30 and 31 are secured to the forwardly disposed face of the upright frame 11 at the upper end thereof and in spaced relation. A vertically extending shaft 32 is journalled in bearings in these members and the portion of such shaft intermediate the bearings 30 and 31 passes through a speed reduction unit 33, such part of the shaft being suitably secured to a driving unit (not shown) in the speed reduction unit 33. An electric motor (not shown), which may be of the explosion-proof type, is mounted on the rear face of the upright frame 11, and the shaft of such motor is extended into and connected to an element in the speed reduction unit 13, wherefore when the motor is set in operation, the shaft 32 is caused to rotate at a predetermined speed.

A plurality of impellers generally indicated by 34 are mounted on a portion of the shaft 32 that extends into the vessel 12. Advantageously, a pulley or other stabilizing unit 35 is affixed to the lower end of the shaft 32 in spaced-apart relation with the lower end of the vessel 12, as shown, for example, in FIG. 3.

Each impeller 34 includes a flat annular ring as 36. Spokes as 37 have the upper ends thereof welded or otherwise suitably secured to the margin of the centrally disposed opening in each ring as 36. The lower ends of these downwardly and inwardly inclined spokes are welded or otherwise suitably secured to a collar as 38 which has a medial opening therein that neatly embraces a shaft as 32 when the impellers as 34 are mounted thereon, such impellers being connected to the shaft by set screws 38A, FIG. 2, or the like.

As best shown in FIG. 3, the collar 38 of the lowermost impeller 34 mounted on the shaft 32 is disposed above and slightly spaced from the upper end of the pulley or other stabilizing unit 35 adjacent to the lower end of the shaft 32 as aforesaid. Each collar as 38 of the other impellers is affixed to the shaft slightly above the upper surface of the ring 36 of the impeller disposed immediately therebelow. The impellers 34 that are mounted on the shaft 32 in the portion thereof extended through the ring 14 and into the vessel 12 are of uniform diameter, such diameter being such that the outer periphery of each ring as 36 is disposed in spaced apart relation with the inner surface of the vessel 12.

A screen unit generally indicated by 39 is mounted on the ring 14. A groove 41 is formed in the outer periphery of the ring 14 at the upper end thereof, and the inner marginal portion of the lower ring 40 is mounted in the groove 41, and the ring is secured in this groove in any suitable manner to be effective to prevent displacement of the screen unit 39 in the course of operation of the apparatus and also so as to prevent leakage past these elements. The screen wall of the screen unit 39 is afforded by two substantially semicircular sections 42 and 43. The vertical free edges of the screen section 42 are connected to plates as 44 and 45, corresponding edges of the section 43 being respectively connected to plates as 46 and 47. The plates extend outwardly from the peripheries of the sections 42 and 43, and adjacent faces of the plates 44 and 46 and 45 and 47 respectively are engaged one with the other. Bolt and nut means or the like as 48 extend through the abutted plates, and when tightened secure the sections 42 and 43 together to thereby afford a circular screen wall generally indicated by 49. As best shown in FIG. 2, a groove 50 is afforded in the upwardly and inwardly disposed face of the ring 40 and the lower end of the screen wall 49 is disposed in this groove and is suitably secured to the ring 40 to prevent separation of the screen wall 49 from the ring 40 and to prevent leakage past these elements. A ring 51 is mounted at the upper end of the screen wall 49 and is supported by the plates as 44 and 45 and 46 and 47.

Desirably, a removable cover C is provided at the top of the screen enclosed area. As best shown in FIG. 2 this cover C is of sufficient size to not only cover the screen enclosed area of the apparatus but also is of sufficient size to also cover the chamber into which the product being processed is discharged as will be explained presently. The cover C is afforded by two flat plates or sections of semi-circular outline. The flat edges of such sections are abutted medially above the screen enclosed area of the apparatus, there being a semicircular opening in each of the abutted edges of such sections through which the shaft 32 may be extended. In order to prevent displacement of the semi-circular sections of the cap C from the intended operative position thereof, each of such sections has a semi-circular groove formed in the lower face thereof that is adapted to neatly embrace the ring 51 and the portion of the screen connected to the inner wall of such ring. Moreover, since either or both sections of the cover C will be removed from time to time, as for example, when sand is to be introduced into the apparatus, each such section has one or more handles H formed thereon to facilitate lifting the cover C from its operative position.

The inner diameter of the screen wall 49 is of greater diameter than the inner diameter of the mixing vessel 12, as best shown in FIG. 2, and the inclined inner wall 15 of the ring 14 affords a surface over which material being processed in the apparatus may flow unimpededly from the mixing vessel 12 into the screen unit 39. Desirably, the diameter of the screen wall 49 is in the order of from about 15 to about 25% greater than the inner diameter of the vessel 12. Moreover, impellers as 34A are mounted on the lower portion of the section of the shaft 32 that extends through the screen unit 39. The impellers 34A are similar in construction to the impellers 34, but the diameter of the impellers 34A is greater than the diameter of the impellers 34, such increase in diameter advantageously being of the same order as the increased diameter of the screen wall 49 with relative to the inner diameter of the mixing vessel 12. In the present instance, three impellers as 34A are mounted on the section of the shaft 32 that extends through the screen unit, but it will be understood that additional impellers as 34A may be mounted on this shaft on this part thereof and in some instances resort may be had to a lesser number of impellers.

It has been found to be advantageous to dispose the uppermost of the impellers as 34A in spaced relation with the cover C to thereby afford a screen enclosed area beneath the cover C and above the uppermost of the impellers 34A of sufficient size that a comparatively appreciable portion of the sand laden product being processed may accumulate above the upper impeller 34A without being forced or floated past the cover C particularly since, as has been explained hereinabove, it is quite disadvantageous so to do. Thus, the height of the screen wall 49 is sufficient to afford what in effect is a storage area above the uppermost impeller 34A that will be of sufficient capacity to insure proper operation of the apparatus.

While in the illustrated form of the invention the screen wall 49 is afforded by a conventionally woven screen, it will be understood that reference to a screen herein through which the processed product is to flow to have the sand separated therefrom will also embrace equivalent structures. For example, resort may be had to a vertical wall having slots formed therein at spaced apart intervals and in appropriate positions. In any event, however, any screen, slotted wall or equivalent arrangement to which resort is had will be so arranged that interstices or other openings afforded therein will be of a size smaller than the smallest grain size of the sand particles introduced into the apparatus. This, of course, is essential inasmuch as the purpose of the screen wall 49 or the like is to separate the sand particles from the product being processed as the same flows into the accumulating chamber 58.

An annular or ring-like member 52 is disposed about the ring 14 and the lower portion of the screen wall 49. The inner diameter of the member 52 is sufficient to insure that such inner wall thereof will be spaced from the outwardly disposed face of the ring 14 and the lower portion of the screen wall 49 sufficiently that a product accumulating area outwardly of the screen will be afforded.

The annular member 52 rests on the upper flat faces of the angle brackets as 22 which, as explained, are attached to the front face of the upright frame 11 by bolts as 53. A discharge chute 55 is provided in the annular member 52. The outer free end of this discharge chute is preferably disposed outwardly and downwardly of the annular member 52. As best shown in FIG. 2, the lower wall of the discharge chute 55 is downwardly and outwardly inclined and this lower wall has an opening 54 formed therein that neatly fits about the outer wall of the ring 14 and preferably these elements are united one with the other as by being welded. Also as shown in FIG. 2, the discharge chute 55 is open at the top wherefore the discharge chute affords a part of the product accumulating area afforded in the apparatus.

A downwardly opening top closure member 56 is provided which, as best shown in FIGS. 2 and 3, includes a top wall that will be spaced above the cover C when the closure member is mounted in the operative position thereof. As in the instance of the cap or cover C, the closure member 56 is afforded by two semi-circular sections, the vertically disposed edges of which are abutted one with the other and are maintained in this abutting relation so as to prevent leakage from the aforesaid product accumulating chamber 58. The top closure member 56 is mounted above the annular member 52 and each section thereof is so arranged that inadvertent displacement of each section of the closure member 56 will be prevented. To this end a semi-circular flange member 56A is welded or otherwise suitably secured to the outer wall of each of the sections of the closure member 56 is spaced relation with the respective lower edges of such sections. Each flange member as 56A includes a downwardly extending flange 56B, the inner face of which is so spaced from the outer periphery of the lower marginal portion of each section of the closure member 56 that when the sections of the closure member 56 are disposed in operative position the upper marginal portion of the annular member 52 will be neatly embraced between the inner face of each flange as 56B and the adjacent outer periphery of each section of the closure member 56. Since it will be advantageous from time to time to remove one or both of the sections of the top closure member 56 from operative position handles as 57 are provided on such sections which may be grasped to facilitate removal of the respective section from operative position. The inner surface of each section of the top closure member 56 is spaced from the outer periphery of the screen wall 49 whereby to afford another part of the product accumulating area 58 into which the product being processed is fed by passage thereof through the interstices in the screen wall 49.

While the processed product flowing from the discharge chute 55 may be collected in any desired manner, a convenient way so to do is to provide an open top collecting vessel 59 which is removably supported on a bracket as 60 that is attached to the outer wall of the jacket 13 in such position that the open top of the vessel 59 will be disposed beneath the discharge end of the discharge chute 55. While in some instances it may be desirable to resort to a closed bottom collecting vessel as 59, in most instances an opening will be provided in the bottom wall of the vessel 59 in position to communicate with the inlet of a pipe 61 which in this instance is directed to the inlet of a discharge pump 62. The outlet means 63 leading from the pump 62 may be directed to suitable means for storing the processed material or such outlet means may be directed to any other suitable means adapted to receive and, in some instances, further process the processed material.

The material to be processed is withdrawn from a premix tank or other suitable apparatus and is directed through a pipe 64 to the inlet of a metering pump 65. Suitable conduit means as 66 lead from the outlet of the metering pump as 65, and the discharge end of such means is connected to the coupling 29 on the plate 23 so that when in operation the metering pump 65 will be effective to force the material to be processed into and through the apparatus. The metering pump 65 may be of conventional form, but is of such nature that the output thereof may be readily adjusted for purposes to be described presently.

When the bottom plate 23 is secured to the lower end of the mixing vessel 12 and the conduit means as 66 have been secured in the coupling 29, the apparatus is in condition for operation. However, prior to the time the metering pump 65 is set in operation, one or both of the sections of the closure member 56 are removed from the apparatus as well as one or both sections of the cover C. Thereupon sand is introduced into the apparatus in a sufficient quantity to almost fill the mixing vessel 12 at least up to the vicinity of the ring 14.

Desirably, the sand so introduced into the apparatus is what is known as "Ottawa Sand" which is a term applied to sand found in the vicinity of Ottawa, Illinois, United States of America, and is that referred to in ASTM Specification C-190 as a standard testing sand for testing concrete. Such sand is characterized by having a high (99% or more) silica content and substantially all of the particles are individual crystals or parts thereof and it is practically free of agglomerates or groups of crystals cemented together by foreign materials and the individual particles have rounded edges. Resort is usually had to 20 to 30 mesh Ottawa sand but in some circumstances resort may be had to sand of as low as 10 mesh or as high as 40 mesh. The use of such sand is common practice in sand grinding operations in the production of automotive, industrial and kindred finishes, including also house and architectural paints and the like. Moreover, as explained in aforesaid Letters Patent No. 2,581,414, for some purposes resort may be had to glass and some plastic beads sized correspondingly to the grain size or mesh of the Ottawa sand, such beads being hard and relatively non-friable and inert from the standpoint of affecting material to be processed in the apparatus. It is therefore to be understood that reference herein to sand is in the generic sense and embraces the various grinding materials such as those referred to hereinabove.

The screen unit 39 is so constructed, arranged and mounted that the discharge flow of processed material will be limited to the screen wall 49 thereof. It is, of course, important, as explained above, that the size of the interstices in the screen be related to the grain size of the sand particles that are introduced into the mixing vessel 12. For example, where resort is had to 20–30 mesh sand (0.84–0.59 mm.) a standard 35 x 35 mesh screen having 0.35 mm. openings is suitable. In any event, however, the interstices in the screen wall will be so related to the particle size of the sand that the material being processed will freely flow through the interstices in the screen while the sand is separated therefrom and retained in the apparatus.

The apparatus as described hereinabove may be utilized in the same manner as the apparatus disclosed in aforesaid Letters Patent No. 2,855,156, and particularly in the production of high grind finishes. Thus, an alkyd resin enamel mill base such as that of Example I of Patent No. 2,855,156 may be processed in the above described apparatus disclosed in that patent. Also, as disclosed in that patent, the volume of the material to be processed is related to the volume of the sand charge in the apparatus so as to effect a desired grind of the material to be processed. This is attained by varying the output of the metering pump 65 in such a way that the desired grind is effected. The material flows through the mixing vessel 12 and the sand therein to be subjected to a grinding action and then into the area enclosed by the screen wall 49. The material then flows through the screen and into the chamber 58 to be discharged through the discharge spout 55. When the desired product is being collected in the vessel as 59 the apparatus is then maintained in operation for so long as production of the particular product is desired.

In contradistinction to this, however, and especially because of the increased diameter of the screened area of the apparatus, the increased diameter of the impellers located in such portion of the apparatus and the storage area above the uppermost of the impellers in the screened area, a full charge of sand may be retained in the apparatus even though a relatively high volume of the product to be processed is passed through the apparatus. This is so because the enlarged propellers as 34A, to which resort is had in my apparatus, have a relatively high peripheral speed and resultantly even though sand is present in the screen enclosed portion of the apparatus, a low grind finish will properly flow through the interstices in the screen into the chamber 58 and the discharge spout 55 without having sand forced too high in the screened area and over the top of the screen wall. An example of a low grind finish which may expeditiously be processed in a normal sand charge in the apparatus described hereinabove is an enamelized house paint compounded in accordance with the following example:

| | Gal. |
|---|---|
| Non-chalking titanium dioxide | 7.8 |
| Zinc oxide | .2 |
| Bentone | .24 |
| Ethyl alcohol | .96 |
| Vehicle, long, oil alkyl (25% solids) | 20.5 |

An enamelized house paint compounded in accordance with the above example affords 29.7 gal. of a slurry in the nature of that usually subjected to roll, pebble or like milling or other well-known grinding operations. The approximate viscosity of such a slurry is 97 K.U. The quantity of such a slurry that will be compounded and passed through the apparatus is, of course, determined by the quantity of a so-called premix that is to be produced in a particular run through the apparatus disclosed herein and this quantity, ultimately, is determined by the quantity of finished product desired. A slurry compounded as aforesaid may advantageously be processed in the apparatus disclosed herein, containing a normal sand charge as aforesaid, at such a rate as to produce 216 g.p.h. of the processed product. Such a product is usually let down so as to afford the desired quantity of finished product, in this instance, an enamelized house paint. Thus, for example, each 29.7 gal. of premix compounded aforesaid, processed in and flowing out of the apparatus may be dispersed in 72.3 gal. of a suitable letdown vehicle and drier to thereby afford 102 gal. of the desired finished product. Hence, under the circumstances described above, the apparatus described herein will, in effect, produce 741 g.p.h. of the finished product.

In processing an enamelized house paint, such as that of the foregoing example, in apparatus such as disclosed herein, as little as twenty-five percent by weight or volume of the finished product need be processed in the apparatus and yet afford a satisfactory and usable dispersion of the processed ingredients. As an example of the efficacy of the present apparatus, a slurry for an enamelized house paint of the aforesaid formula and constituting but 29.1 percent of the finished formula may be processed in the apparatus in such a way as to have an output of 216 g.p.h. of premix or paste, which is equivalent to producing 741 g.p.h. of the finished paint. When such a slurry has heretofore been processed in the apparatus of Letters Patent No. 2,855,156, it has been necessary to effect a reduction of as much as two-thirds of the sand charge in the apparatus and in such apparatus so arranged, and of a size equivalent to apparatus constructed in accordance with our invention, the output was at a rate of only 145 g.p.h. of premix or paste.

Therefore, apparatus constructed in accordance with our invention can be charged with sand as hereinabove described and kept in substantially continuous operation. Inasmuch as it is not necessary to reduce the sand charge in the apparatus described hereinabove from that employed for a high grind finish so as to thereby enable a low grind finish to be passed through the apparatus without over-grinding, considerable savings in the finish production are realized by resort to our improved apparatus.

Primarily because of the large screen enclosed area in the apparatus, and also because of the relatively high peripheral speed of the impellers in such area, a rather appreciable portion of the sand in the apparatus may flow into the screen enclosed area thereof without effectively impairing operation of the apparatus. Moreover, the inclined wall 15 of the ring 14 enables unimpeded flow into the screen enclosed area of the apparatus and such wall also enables unimpeded return to the vessel 12 of sand from the screen enclosed area as such may occur in the normal operation of the apparatus.

Our novel apparatus is readily adaptable for substantially continuous production since a desired quantity of a particular slurry may be passed through the apparatus and immediately thereafter another and different slurry may be introduced into the apparatus. There may, of course, be a short period of co-mingling of the initial slurry with that which follows, but such co-mingled product can readily be collected in a vessel as 59. Thus when a particular slurry is being processed in the above described apparatus and is being collected in a vessel as 59, such production and collection can be continued for so long as the desired product flows from the discharge chute 55. When a different slurry is to be processed in the machine immediately following the processing of a particular slurry, and when co-mingled slurries start to flow from the discharge chute 55, one collecting vessel as 59 will be substituted for that previously employed. Collection of the co-mingled slurry will then be continued until only the second of the slurries starts to discharge from chute 55. At this time, yet another collecting vessel 59 will be substituted for that in which the co-mingled slurries have been collected, and thereafter operation of the apparatus will continue as above described.

There will, of course, be instances where it will be advantageous to clean the apparatus when the production of a particular product is to be interrupted. In such circumstances a suitable solvent may be directed to the metering pump 65, and this solvent will be of such nature that any residual of a previously processed product will be picked up by the solvent and discharged through the chute 55. Such flushing of the apparatus may be desirable when operation of the apparatus is to be interrupted for any reason, such as an overnight or weekend shutdown.

It will be manifest from the foregoing description that we have provided improved apparatus in which sand grinding may be expeditiously effected principally by the small impellers 34 in the vessel 12 where these impellers, in cooperation with the adjacent wall of the vessel 12 and the sand or other grinding media contained thereby, grind the particulate solids to a finer state. The impellers 34 are thus primarily responsible for grinding, and are, therefore, of greater number and extent in contrast to the larger impellers 34A in the discharge screen area, itself enlarged in comparison to the vessel 12, which function primarily to discharge the ground product, and to do this rapidly for a low grind (coarse) product when the rate of feed of the slurry is accordingly increased and likely to cause more of a rise of sand into the screen area. The apparatus is of such nature that high grind finishes may be produced therein in the same manner as that in which such finishes are now produced by resorting to the sand grinding process. However, the apparatus is of such nature that low grind finishes may be expeditiously produced therein without over-grinding thereof, and such finishes may be produced in the apparatus in higher quantities than could heretofore be produced by sand grinding operations.

It will therefore be seen that the apparatus as described hereinabove enables the hereinabove set forth and kindred objects of this invention to be realized. Hence, while preferred embodiments of the invention have been described and illustrated, it is to be understood that they are capable of variation and modifications, and we therefore do not wish to be limited to the precise details set forth, but desire to avail ourselves of such changes and alterations as fall within the purview of the following claims.

We claim:

1. An apparatus for deagglomerating and dispersing particulate solids in liquids by the grinding action of grinding media on the solids and which comprises a vertical cylindrical mixing vessel of predetermined diameter having an inlet at or near the bottom thereof and adapted to contain a charge of the grinding media, a cylindrical screen enclosed area at the top of such vessel of a diameter greater than that of the vessel, a rotatable shaft extended through the screen enclosed area and into said vessel generally along the cylindrical axes thereof, impellers of a predetermined number and diameter mounted on the portion of said shaft disposed within the vessel, and other impellers of a diameter greater and number less than that of the aforesaid impellers mounted on the portion of said shaft extended through the screen enclosed area whereby solids and liquid introduced into said vessel through said inlet are first subjected to the action of the smaller impellers mounted on the portion of said shaft disposed within said vessel where said smaller impellers cooperate with the adjacent wall of the vessel and the grinding media therein to grind said solids and are thereafter discharged through said screen enclosed area by the impellers mounted on the portion of said shaft extended through said screen enclosed area.

2. An apparatus for deagglomerating and dispersing particulate solids in liquids by the grinding action of grinding media on the solids and which comprises a vertical cylindrical mixing vessel of predetermined diameter having an inlet at or near the bottom thereof, a cylindrical screen enclosed area at the top of such vessel of a diameter greater than that of the vessel, a rotatable shaft extended through the screen enclosed area and into said vessel generally along the cylindrical axes thereof, impellers of a number of predetermined diameter mounted on the portion of said shaft disposed within the vessel, other impellers of a diameter greater and number less than that of the aforesaid impellers mounted on the portion of said shaft extended through the screen enclosed area whereby solids and liquid introduced into said vessel through said inlet are first subjected to the action of the smaller impellers mounted on the portion of said shaft disposed within said vessel where said smaller impellers cooperate with the adjacent wall of the vessel and the grinding media therein to grind said solids and are thereafter discharged through said screen enclosed area by the impellers mounted on the portion of said shaft extended through said screen enclosed area, and means disposed between the top of said vessel and the lower edge of the screen enclosed area affording a surface over which unimpeded flow of solids and liquids being acted upon by said impellers may be effected from said vessel to said screen enclosed area.

3. An apparatus for deagglomerating and dispersing particulate solids in liquids which comprises a vertical cylindrical mixing vessel of predetermined diameter having an inlet at or near the bottom thereof, said vessel being adapted to have a charge of sand introduced thereinto to at least substantially fill the same, a cylindrical screen enclosed area at the top of such vessel of a diameter greater than that of the vessel, a rotatable shaft extended through the screen enclosed area and into said vessel generally along the cylindrical axes thereof, impellers of a predetermined number and diameter mounted on the portion of said shaft disposed within the vessel, other impellers of a diameter greater and number less than that of the aforesaid impellers mounted on the portion of said shaft extended through the screen enclosed area, said shaft and the smaller impellers, when the shaft is set in rotation, being effective in cooperation with the adjacent wall of the mixing vessel to agitate sand and solids and liquids in said mixing vessel to thereby effect deagglomeration and dispersion of the solids in the liquid, said screen enclosed area having interstices in at least a substantial part of the vertical wall thereof of a size smaller than the smallest grain size of sand introduced into the apparatus whereby, primarily under the effect of the rotating impellers in the screen enclosed area of the apparatus, the dispersion may flow through the aforesaid interstices and be collected while the sand is retained in the apparatus.

4. An apparatus for deagglomerating and dispersing particulate solids in liquids which comprises a vertical cylindrical mixing vessel of predetermined diameter having an inlet at or near the bottom thereof, said vessel being adapted to have a charge of sand introduced thereinto to at least substantially fill the same, a cylindrical screen enclosed area at the top of such vessel of a diameter greater than that of the vessel, a rotatable shaft extended through the screen enclosed area and into said vessel generally along the cylindrical axes thereof, impellers of a predetermined number and diameter mounted on the portion of said shaft disposed within the vessel, other impellers of a diameter greater and number less than that of the aforesaid impellers mounted on the portion of said shaft extended through the screen enclosed area, said shaft and the smaller impellers, when the shaft is set in rotation, being effective in cooperation with the adjacent wall of the mixing vessel to agitate sand and solids and liquids in said apparatus to thereby effect deagglomeration and dispersion of the solids in the liquid primarily within said mixing vessel, said screen enclosed area having interstices in at least a substantial part of the vertical wall thereof of a size smaller than the smallest grain size of sand introduced into the apparatus whereby, primarily under the effect of the rotating impellers in the screen enclosed area of the apparatus, the dispersion may flow through the aforesaid interstices and be collected while the sand is retained in the apparatus, and an inwardly sloping transition area between said vessel and screen enclosed area over which unimpeded flow of sand, solids and liquid into said screen enclosed area may be affected as well as unimpeded return flow of sand from said area to said vessel.

5. An apparatus for deagglomerating and dispersing particulate solids in liquids by the grinding action of grinding media on the solids and which comprises a vertical cylindrical mixing vessel of predetermined diameter having an inlet at or near the bottom thereof and adapted to contain a charge of the grinding media, a cylindrical screen enclosed area at the top of such vessel of a diameter greater and number less than that of the vessel, such increase in diameter being in the order of from about 15 to about 25%, a rotatable shaft extended through the screen enclosed area and into said vessel generally along the cylindrical axes thereof, impellers of a predetermined diameter mounted on the portion of said shaft disposed within the vessel, and other impellers of a diameter greater than that of the aforesaid impellers mounted on the portion of said shaft extended through the screen enclosed area whereby solids and liquid introduced into said vessel through said inlet are first subjected to the action of the smaller impellers mounted on the portion of said shaft disposed within said vessel where said smaller impellers cooperate with the adjacent wall of said vessel and the grinding media therein to grind said solids and are thereafter discharged through said screen enclosed area by the impellers mounted on the portion of said shaft extended through said screen enclosed area.

6. An apparatus for deagglomerating and dispersing particulate solids in liquids which comprises a vertical cylindrical mixing vessel of predetermined diameter having an inlet at or near the bottom thereof, a cylindrical screen enclosed area at the top of such vessel of a diameter greater than that of the vessel, such increase in diameter being in the order of from about 15 to about 25%, a rotatable shaft extended through the screen enclosed area and into said vessel generally along the cylindrical axes thereof, impellers of a predetermined diameter and number mounted on the portion of said shaft disposed within the vessel, and other impellers of a diameter greater and number less than the aforesaid impellers mounted on the portions of said shaft extended through the screen enclosed area, such increase in the diameter of the last impellers being in the order of from about 15 to about 25%, said vessel being adapted to have a charge of sand introduced thereinto to at least substantially fill the same, said shaft and the smaller impellers, when the shaft is set in rotation, being effective in cooperation with the adjacent wall of the mixing vessel to agitate sand and solids and liquids in said mixing vessel to thereby effect deagglomeration and dispersion of the solids in the liquid, and whereby the larger impellers in the screen enclosed area cause the dispersion to be discharged through said screen enclosed area.

7. An apparatus for deagglomerating and dispersing particulate solids in liquids which comprises a vertical cylindrical mixing vessel of predetermined diameter having an inlet at or near the bottom thereof, a cylindrical screen enclosed area at the top of such vessel of a diameter greater than that of the vessel, such increase in diameter being in the order of from about 15 to about 25%, a rotatable shaft extended through the screen enclosed area and into said vessel generally along the cylindrical axes thereof, impellers of a predetermined diameter and number mounted on the portion of said shaft disposed within the vessel, and other impellers of a diameter greater and number less than the aforesaid impellers mounted on the portions of said shaft extended through the screen enclosed area, such increase in the diameter of the last impellers being in the order of from about 15 to about 25%, said vessel being adapted to have a charge of sand introduced thereinto to at least substantially fill the same, said shaft and smaller impellers, when the shaft is set in rotation, being effective in cooperation with the adjacent wall of the mixing vessel to agitate sand and solids and liquids in said mixing vessel to thereby effect deagglomeration and dispersion of the solids in the liquid, said screen enclosed area having interstices in at least a substantial part of the vertical wall thereof of a size smaller than the smallest grain size of sand introduced into the apparatus whereby, primarily under the effect of the rotating impellers in the screen enclosed area of the apparatus, the dispersion may flow through the aforesaid interstices and be collected while the sand is retained in the apparatus.

8. An apparatus for deagglomerating and dispersing particulate solids in liquids which comprises a vertical cylindrical mixing vessel of predetermined diameter having an inlet at or near the bottom thereof, a cylindrical screen enclosed area at the top of such vessel of a diameter greater than that of the vessel, such increase in diameter being in the order of from about 15 to about 25%, a rotatable shaft extended through the screen enclosed area and into said vessel generally along the cylindrical axes thereof, impellers of a predetermined number and diameter mounted on the portion of said shaft disposed within the vessel, and other impellers of a diameter greater and number less than the aforesaid impellers mounted on the portions of said shaft extended through the screen enclosed area, such increase in the diameter of the last impellers being in the order of from about 15 to about 25%, said vessel being adapted to have a charge of sand introduced thereinto to at least substantially fill the same, said shaft and smaller impellers, when the shaft is set in rotation, being effective in cooperation with the adjacent wall of the mixing vessel to agitate sand and solids and liquids in said mixing vessel to thereby effect deagglomeration and dispersion of the solids in the liquid, said screen enclosed area having interstices in at least a substantial part of the vertical wall thereof of a size smaller than the smallest grain size of sand introduced into the apparatus whereby, primarily under the effect of the rotating impellers in the screen enclosed area of the apparatus, the dispersion may flow through the aforesaid interstices and be collected while the sand is retained in the apparatus, and an inwardly sloping transition area between said vessel and screen enclosed area over which unimpeded flow of sand, solids and liquid into said screen enclosed area may be affected as well as unimpeded return flow of sand from said area to said vessel.

9. An apparatus for deagglomerating and dispersing particulate solids in liquids by the grinding action of grinding media on the solids and which comprises a vertical cylindrical mixing vessel of predetermined diameter having an inlet at or near the bottom thereof and adapted to contain a charge of the grinding media, a cylindrical screen enclosed area at the top of such a vessel of a diameter greater than that of the vessel, a rotatable shaft extended through the screen enclosed area and into said vessel generally along the cylindrical axes thereof, impellers of a predetermined diameter mounted on the portion of said shaft disposed within the vessel, and other impellers of a predetermined diameter mounted on the portion of said shaft extended through the screen enclosed area thereof whereby solids and liquid introduced into said vessel through said inlet are first subjected to the action of the impellers mounted on the portion of said shaft disposed within said vessel and are thereafter acted upon by the impellers mounted on the portion of said shaft extended through said screen enclosed area.

References Cited in the file of this patent

UNITED STATES PATENTS

| 1,780,067 | Cox | Oct. 28, 1930 |
| 2,738,065 | Mahlkurch | Mar. 13, 1956 |
| 2,855,156 | Hochberg et al. | Oct. 7, 1958 |

FOREIGN PATENTS

| 388,293 | France | May 26, 1908 |